United States Patent [19]

Bayshore

[11] Patent Number: 4,618,227
[45] Date of Patent: Oct. 21, 1986

[54] SOFT CONTACT LENS

[75] Inventor: Charles A. Bayshore, Orlando, Fla.

[73] Assignee: Vistakon, Inc., Jacksonville, Fla.

[21] Appl. No.: 539,874

[22] Filed: Oct. 7, 1983

[51] Int. Cl.[4] .......................... G02C 7/04; G02C 7/06
[52] U.S. Cl. ............................... 351/161; 351/160 H
[58] Field of Search ............... 351/160 H, 160 R, 161, 351/162

[56] References Cited

U.S. PATENT DOCUMENTS 4,324,461 4/1982 Salvatori ........................ 351/160 H

FOREIGN PATENT DOCUMENTS 2519708 11/1975 Fed. Rep. of Germany ... 351/160 R

OTHER PUBLICATIONS

Advanced Contact Lens Fitting, vol. 1, No. 6, p. 15 (Oct. 1959).
"The Ultracon Prism Bifocal", The Optician 140 (3636), pp. 549–551 (Dec. 19, 1960).
"Corneal and Sclera Contact Lenses", Proceedings of the International Congress, pp. 210–212, (Mar. 20–24, 1966).
Hydrocurve* Product Bulletin, Soft Lens, Inc., (circa 1975).
"Contact Lens Practice: Basic and Advanced", Robert B. Mandell, Charles C. Thomas, Publisher, Springfield, Illinois, p. 244.

Primary Examiner—John K. Corbin
Assistant Examiner—Scott J. Sugarman
Attorney, Agent, or Firm—Wayne R. Eberhardt

[57] ABSTRACT

A soft contact lens, particularly a multifocal or toric lens having prism ballast for lens orientation, is provided with a channel in the back surface of the lens circumscribing the optical zone of the lens to impart flexibility to the peripheral area of the lens and to provide for improved tear distribution. Optionally, the channel may be included in the front surface of the lens to impart flexibility to the peripheral area of the lens without affecting tear distribution. Advantages of the channel are particularly evident in flexibility of multifocal lenses which have significant vertical translation between the near and distance vision modes.

14 Claims, 9 Drawing Figures

SOFT CONTACT LENS

FIELD OF THE INVENTION

This invention relates to soft contact lenses, and, more particularly, to multifocal, soft contact lenses having prism ballast and adapted to translate in a controlled vertical movement between the distance vision mode and the near vision mode.

BACKGROUND OF THE INVENTION

Multifocal contact lenses of the hard type have been available for a number of years, while soft multifocal lenses have been under investigation and development. Multifocal contact lenses, most usually bifocal lenses, are designed to correct presbyopia, a condition which develops with advancing age and causes the eye to lose its ability to focus at near distances such as the normal reading distance. Contact lenses designed to correct presbyopia are generally of two types designated as concentric and nonconcentric or segmented.

The concentric contact lens is characterized in that a material having a different refractive index than that of the principle material surrounds the geometric center of the lens in a generally concentric ring. Alternatively, a portion of the lens may be ground to a shorter focal length in a generally concentric pattern relative to the geometric center of the lens. The concentric contact lens is intended to remain centered on the cornea at all times. Distance vision is obtained through the center portion of the lens which may have a diameter of from 1 to about 4 mm. Near vision is obtained through the peripheral concentric portion of the lens. While a portion of the actual perceived image is always out of focus in such a bifocal lens, the user is generally able to mentally reject the out-of-focus portion of the image in favor of the in-focus portion.

The nonconcentric or segmented contact lens is generally characterized in that the near vision element having a different refractive index or ground to provide a shorter focal length, generally referred to as the bifocal segment of the lens, is located in the lower sector or portion of the lens away from the geometric center which comprises the distance vision portion of the lens. Most segmented contact lenses are intended to translate, i.e., move vertically relative to the pupil of the eye when shifting between the distance vision mode and the near vision mode. Such lenses have an advantage in providing a greater proportion of in-focus image at both far and near distances, but have a disadvantage in that the lens must be designed for controlled translation and for maintaining translation and vertical orientation during use.

Segmented bifocal lenses and other contact lenses which require a predetermined orientation on the eye, such as the toric lens which is intended to correct astigmatism, have commonly utilized two basic techniques to assure correct orientation. The lens may be provided with a base-down prism to increase the mass of the lower portion of the lens and create a weighting effect to orient the lens. The lens may also be provided with horizontal truncation or beveling along the lower and/or upper edges so that the combination of eyelid forces and scleral shaping effectively prevent the lens from rotating on the cornea.

It is an object of the present invention to provide a segmented, soft, multifocal contact lens of improved design. It is a further object to provide an improved soft, multifocal contact lens which is readily translated by the user and is free from distortion in both near and distance visual modes. It is a yet further object of this invention to provide a soft contact lens with improved tear distribution and concomitant oxygen supply to the surface of the eye covered by the lens.

SUMMARY

The multifocal contact lens of the present invention comprises a lens body of a conventional soft contact lens composition, having a generally spherical concave back surface adapted to fit the cornea of an eye, a generally convex front surface, and at least two optical zones having different focal lengths. An optical zone for distance vision is provided with at least a major portion thereof included within the upper half of the lens, while the lower half of the lens includes an optical zone of shorter focal length for near vision.

The lens preferably includes prism ballast to ensure correct orientation and may further include equiangular truncation of the upper half of the lens as described in my copending application Ser. No. 409,467, filed Aug. 19, 1982 now U.S. Pat. No. 4,573,775. Truncation of the upper portion of a lens having prism ballast further lowers the center of gravity of the lens to stabilize the lens in its correct vertical orientation, and additionally enhances the ability of the lens to translate in a vertical direction between the near and distance visual modes. Such lenses typically translate vertically about 4 millimeters or more when the wearer shifts between distance vision and near vision.

Vertical translation of a soft contact lens, especially to the extent occurring in lenses of the type described in Ser. No. 409,467 now U.S. Pat. No. 4,573,775 supra., creates stresses on the lens due to the difference in topography of the portions of the eye covered by the lens in near and distance vision modes. A lens which may be spherical in one vision mode may become aspherical in the other mode due to such stresses, creating lens distortion and an astigmatic condition in the patient.

The lens of the present invention is provided with a circular channel or a groove, preferably on the back surface of the lens, which provides a flexline around the circumference of the lens and allows the edge portion of the lens to adapt to changes in eye curvature during translation, whereby the visual portion of the lens is able to conform to the topography of the eye in both near and distance vision modes to provide distortion free vision.

The channel further increases tear distribution under the lens with improved comfort to the wearer. In a lens with prism ballast, the channel is preferably wider and deeper in the thicker base region of the lens than in the thinner apex region. In an alternative embodiment, the channel may be placed in the front surface of the lens to obtain improved flexibility with no effect on tear distribution.

DESCRIPTION OF PREFERRED EMBODIMENTS

Figure 1:
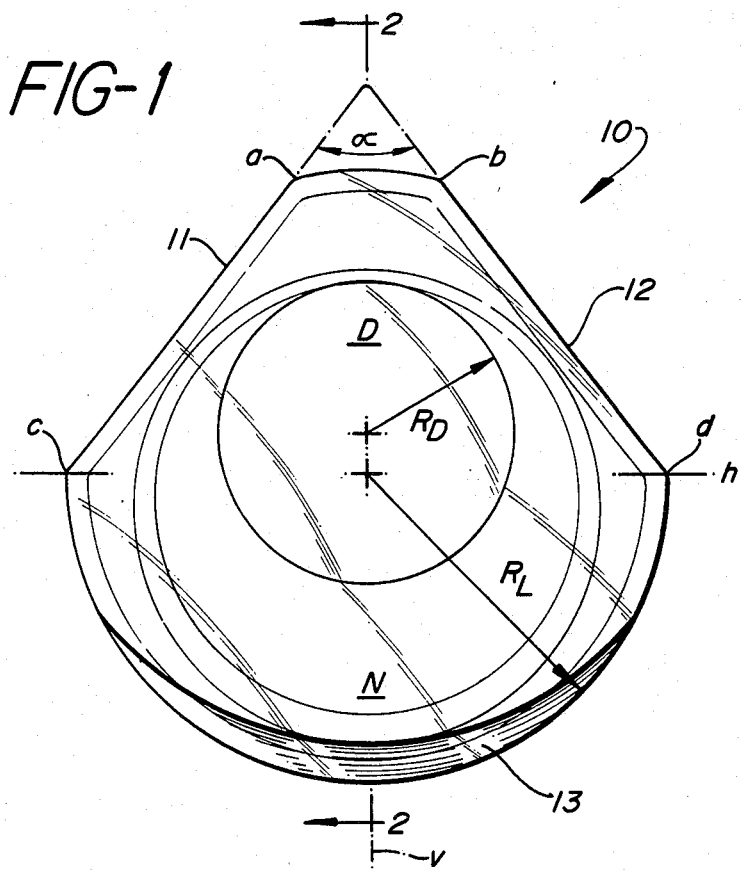
FIG. 1 is a plan front view of a preferred embodiment of a bifocal contact lens in accordance with the present invention.

Referring now more particularly to the drawings, FIG. 1 illustrates a bifocal contact lens body 10 truncated at 11 and 12 in accordance with the invention as disclosed in U.S. Ser. No. 409,467 filed Aug. 19, 1982 now U.S. Pat. No. 4,573,775. The lens is illustrated in the normal vertical orientation which it would assume during use. Horizontal axis (h) and vertical axis (v) pass through the geometric center of the lens. The individual optical zones are presented as distinct areas for clarity of illustration, it being understood that in actual practice, one optical zone may be blended into another and the lines of distinction minimized or eliminated.

In FIG. 1, the distance vision optical zone of the lens is identified as D and comprises circular area having radius $R_D$. The near vision zone is designated as N and comprises the lower portion of the body of the lens. The optical center of the spherical back surface of the lens is conventionally at the geometric center of the lens. The optical center of zone D is located in the superior portion of the lens, preferably on the vertical axis and from about 0.5 to 2 mm above the horizontal axis of the lens. The optical center of zone N may be coincident with the optical center of zone D, or located inferior thereto, preferably also on the vertical axis of the lens. In lenses of higher powers, the optical center of zone N is preferably located at or below the horizontal axis of the lens in order to reduce the thickness of the inferior portion of the lens.

The truncation of the lens at 11 and 12 extends substantially over the two upper quadrants of the lens from points (a) and (b) to points (c) and (d) respectively which are at or near the horizontal axis of the lens. While the truncation at 11 and 12 is preferably chordal and sharply intersecting with the circle defining the circumference of the lens, it is permissible for the truncation to be slightly concave or convex if desired. The included angle of truncation $\alpha$ may be from about 45 to 120 degrees, and is most preferably from about 65 to 80 degrees.

It will be readily appreciated that substantially equiangular truncation of the superior portion of the lens i.e., above the horizontal axis, provides the lens with a center of gravity which is located on the vertical axis some distance below the geometric center of the lens, and the lens will accordingly seek the proper vertical orientation during use as illustrated in FIG. 1. The lens of FIG. 1, however, also includes a base-down prism, as best seen in cross section in FIG. 2, to further lower the center of gravity and stabilize the lens against rotation on the cornea. The lower edge of the lens includes a beveled or otherwise shaped area 13 which determines the angle and thickness of the edge.

Figure 3:
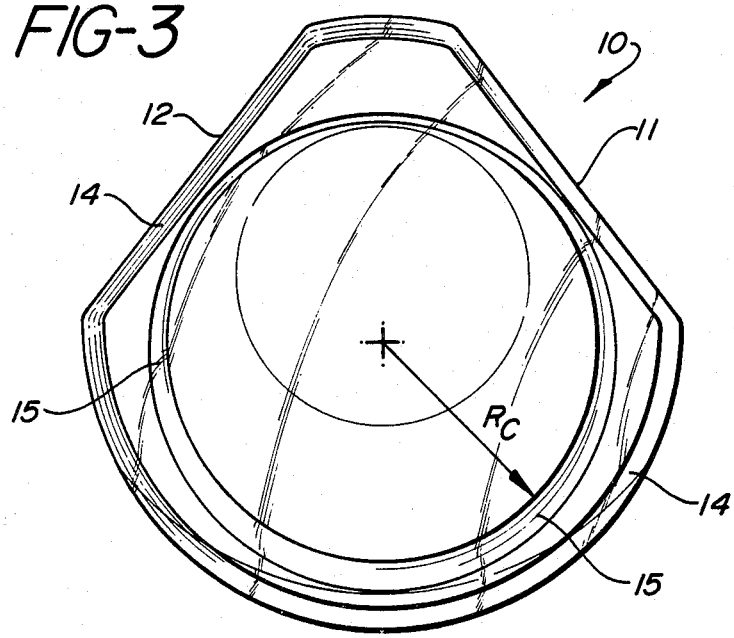
FIG. 3 is a plan rear view of the lens of FIG. 1.
Figure 2:
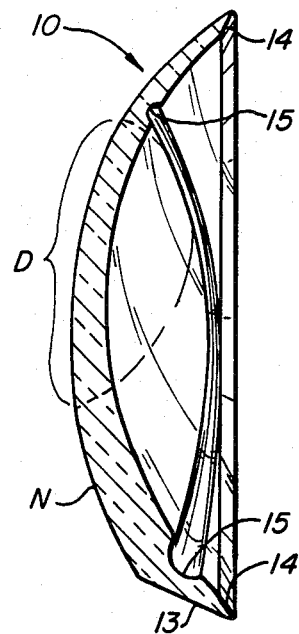
FIG. 2 is a side view in cross-section of the lens of FIG. 1.

The back surface of the lens of FIG. 1 is generally spherical to conform to the curvature of the cornea, and includes peripheral ocular surface 14 as best seen in FIG. 2 and FIG. 3 which conforms generally to the curvature of the sclera. As used herein, the term "generally spherical" is intended to encompass all naturally occurring curvatures of the cornea and accordingly includes aspherical and toric curvatures to the extent such may occur in the human cornea.

The back surface of the lens is further provided with channel 15 having inside radius $R_c$ which circumscribes the lens around the periphery of optical zones D and N.

In the illustrated embodiment of FIGS. 1-3, it is necessary for the channel to be placed off center relative to the geometric center of the lens to avoid having the channel intersect the truncation in the superior portion of the lens. In an alternative embodiment comprising a non-truncated multifocal or toric lens, the channel may be concentric with the outer edge of the lens. Also as illustrated in FIGS. 1-3, the channel increases uniformly in width and depth from the center apex of the channel to the thicker base portion of the lens which includes prism ballast.

Figure 4:
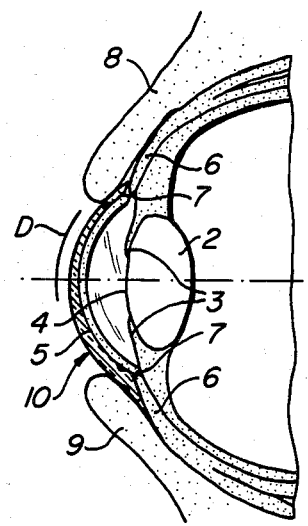
FIG. 4 is an enlarged view of a vertical section of the human eye illustrating the position of the contact lens of FIG. 1 in the distance vision mode.

The performance of translatable multifocal contact lenses such as that of FIG. 1 will now be described with reference to FIGS. 4 and 5 which illustrate the position of the lens on the cornea during use. FIG. 4 illustrates the position of the lens in the distance vision mode, while FIG. 5 illustrates the position of the lens in the reading or near vision mode.

Figure 5:
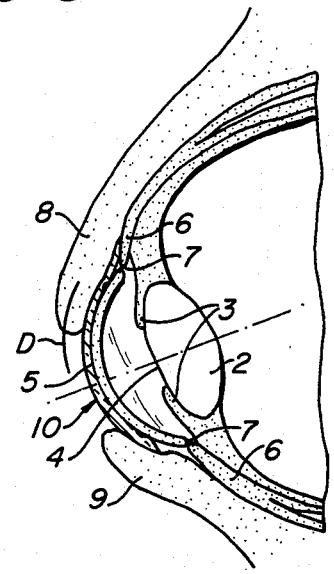
FIG. 5 is an enlarged view of a vertical section of the human eye illustrating the position of the contact lens of FIG. 1 in the near vision mode.

With reference to the anatomy of the human eye, there is illustrated in FIG. 4 and FIG. 5 lens 2 of the eye which in normal use adjusts to variable focal lengths as required for near and distance vision. Over lens 2 is disposed iris 3, the contractile aperature of which defines pupil 4 and controls the amount of light entering through the lens. The cornea 5 forms a transparent and generally spherical convex outside surface of the light transmitting portion of the eye. The cornea is adjoined by sclera 6, the white portion of the eye, and the juncture between the cornea and the sclera constitutes limbus 7. Exterior of the eye are illustrated upper lid 8 and lower lid 9.

Referring now to FIG. 4, contact lens 10 is seen to be centered on cornea 5 in the distance vision mode similar to a conventional monofocal lens. To translate from the distance vision mode of FIG. 4 to the near vision mode of FIG. 5, it is necessary for the lens to move vertically upward on the eye a distance of at least 2 mm, and preferably about 4 mm. This is accomplished by the wearer exercising deliberate eye movements to overcome the forces created by the fit of the lens over the cornea and the surface tension of tears under the lens which tend to keep the lens centered on the cornea.

With reference now to FIG. 4, it can be seen that when the lens is in the distance vision mode, the lower edge of the lens extends a short distance over the sclera of the eye. Upon vertical translation of the lens to the near distance mode, the apex portion of the lens extends over the sclera a greater distance of about 2 to 4 millimeters beyond its normal center resting position as illustrated in FIG. 5. Since the back curve of the lens is generally spherical to conform to the curvature of the cornea, and the curvature of the sclera is less than that of the cornea, any portion of the lens extending onto the sclera must flex from its normal design curvature.

In the lens of the present invention, circumferential channel 15 permits the outer edge of the lens to flex readily as the lens is translated between the near and distance vision modes and the body of the lens thereby conforms more precisely to the curvature of the eye regardless of lens position. Stresses on the lens which ordinarily are experienced when the lens is not centered on the cornea, particularly as in the near distance vision mode, are relieved with a resultant improvement in visual acuity. Additionally, the increased flexibility of the lens reduces the forces normally opposing the translation of the lens to the near distance vision mode. Finally, a channel on the back surface of the lens promotes the distribution of tears around the periphery of the lens resulting in improved oxygen transport to the surface of the eye, particularly in the area of prism ballast where lens thickness is the greatest.

In a preferred embodiment of a lens having prism ballast, the width and depth of channel 15 increase uniformly from the upper to the lower portion of the lens. While a channel of uniform width and depth can be employed, the greater thickness of the lower portion of the lens resulting from the prism ballast makes it desirable to increase the depth of the channel to provide an effective degree of flexibility of the lens in this area.

In a preferred embodiment of the lens of the present invention as illustrated in FIG. 1 through FIG. 3, channel 15 has a radius $R_c$ of 4.0 to 5.5 millimeters while lens body 10 typically has a radius $R_L$ of 6.5 to 7.5 millimeters. Channel 15 is 0.3 millimeters wide and 0.08 millimeters deep at the top of the lens and increases to 1.0 millimeters wide and 0.3 millimeters deep at the base of the lens.

While the effect of channel 15 in the back surface of the lens is of particular significance in connection with translatable multifocal soft contact lenses and most particularly in lenses such as that illustrated in FIG. 1 which have an exceptionally high degree of translatability, beneficial results in terms of tear distribution and wearer comfort are obtained by incorporation of the channel in the back surface of any soft contact lens. Thus, toric and multifocal soft contact lenses which do not translate but include a prism ballast to maintain correct lens orientation may also be modified by incorporating channel 15 in the back surface of the lens. Since such lenses are intended to remain substantially centered on the cornea of the user, channel 15 may likewise be substantially centered on the lens and preferably sized and positioned to coincide with the edge of the cornea.

Figure 6:
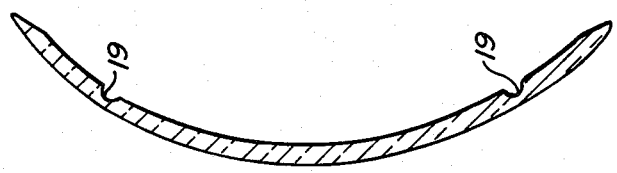
FIG. 6 is a view in profile through the vertical axis of the lens of FIG. 1.
Figure 7:
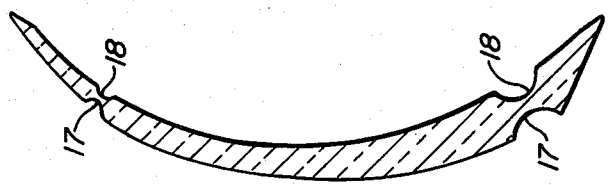
FIG. 7 is a view in profile through the vertical axis of a prism lens in another embodiment of the present invention.
Figure 8:
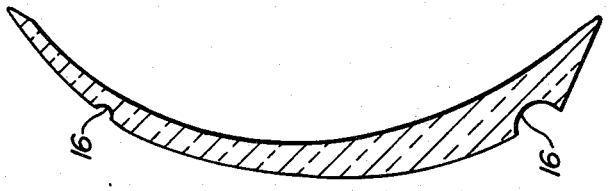
FIG. 8 is a view in profile through the vertical axis of a prism lens in another embodiment of the present invention.
Figure 9:
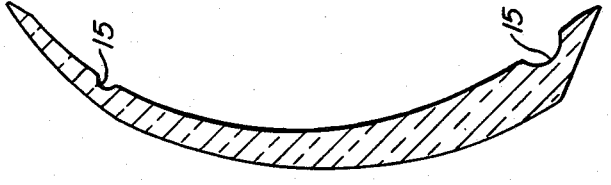
FIG. 9 is a view in profile through the vertical axis of a non-prism lens of the prior art having a circumferential channel in the concave surface.

FIG. 6 illustrates the cross-sectional profile along the vertical axis of the prism lens of FIG. 1. The size and location of channel 15 along the vertical axis is readily apparent. FIG. 7 illustrates a corresponding prism lens having the channel on the front surface while FIG. 8 illustrates a corresponding lens having coincident channels on both the front and rear surfaces. FIG. 9 illustrates a conventional non-prism soft contact lens having a channel on the back surface to promote tear distribution and oxygen transport. In the prior art lens of FIG. 9, channel 19 has a uniform width and depth over its total circumference and is concentric with the outside edge of the lens body.

Lenses of the present invention may be prepared by those skilled in the art utilizing conventional techniques for the fabrication of soft contact lenses. For example, the lenses may be lathe cut from a dehydrated lens blank or button of a hydrophilic polymer and subsequently hydrated to obtain the soft lens product. Alternatively, the lens may be molded in a dehydrated state or in the presence of water or solvent to obtain a soft product. Lens compositions may be of polyhydroxyethylmethacrylate (HEMA), copolymers of HEMA and N-vinylpyrrolidone (NVP), silicone or other material known to be useful in the fabrication of soft contact lenses.

We claim:

1. A soft contact lens comprising a prism lens body having a central vertical axis and a thickness which increases from a minimum to a maximum along said vertical axis to provide a base-down prism ballast, said lens body having a generally spherical, concave back surface adapted to fit the cornea of a human eye and a generally convex front surface, said lens body having a central optical zone and a peripheral border zone and a channel circumscribing said optical zone in at least one surface of said lens body, the depth of said channel increasing uniformly from a minimum at the apex of said prism ballast to a maximum at the base of said prism ballast.

2. The lens of claim 1 wherein the center of said optical zone is at the geometric center of said lens.

3. The lens of claim 2 wherein said channel is concentric with said optical zone and said peripheral zone.

4. A lens of claim 1 wherein the width of said channel increases uniformly from a minimum at the apex of said prism ballast to a maximum at the base of said prism ballast.

5. A lens of claim 1 wherein said lens body has a diameter of 13 to 15 millimeters, said optical zone has a diameter of 8 to 11 millimeters, and the channel is in the peripheral zone is immediately adjacent the border of said optical zone.

6. A lens of claim 1 wherein said channel is in the back surface of said lens body.

7. A lens of claim 1 wherein said channel is in the front surface of said lens body.

8. A lens of claim 1 wherein said channel is in each of said front and back surfaces of said lens body.

9. A multifocal contact lens comprising a prism lens body having a central vertical axis and a thickness which increases from a minimum to a maximum along said vertical axis to provide a base-down prism ballast, said lens body having a generally spherical, concave back surface adapted to fit the cornea of a human eye and a generally convex front surface,
said lens body having a central horizontal axis defining superior and inferior portions of the lens,
said lens body including a first optical zone having at least a major portion thereof in the superior portion of the lens and a second optical zone having at least a major portion thereof in the inferior portion of the lens, the focal length of said optical zone being shorter than that of said first optical zone,
said lens body having a channel in at least one surface thereof circumscribing said first and second optical zones, the depth of said channel increasing uniformly from a minimum at the apex of said prism ballast to a maximum at the base of said prism ballast.

10. A lens of claim 9 wherein the width of said channel increases uniformly from a minimum at the apex of said prism ballast to a maximum at the base of said prism ballast.

11. The lens of claim 9 wherein said lens body has a diameter of from about 13 to 15 millimeters and the channel circumscribing said optical zones has a diameter of from about 8 to 11 millimeters.

12. A lens of claim 9 wherein the superior portion of said lens body is substantially equiangularly truncated from points on each side of said vertical axis at the apex of said lens to points on each respective side of said lens proximal the horizontal axis.

13. A lens of claim 12 wherein the optical center of said first optical zone is on the vertical axis in the superior portion of the lens.

14. A lens of claim 12 wherein the center point defined by said channel circumscribing said optical zones is on the vertical axis in the inferior portion of the lens whereby said channel is non-concentric with the outer edge of said lens.

* * * * *